Aug. 15, 1950 L. B. GREENLEAF 2,519,312

MAGAZINE FOR MAGNETIC RECORDING APPARATUS

Filed May 16, 1945 3 Sheets-Sheet 1

Inventor:
Leland B. Greenleaf,
By Dawson, Ooms & Booth,
Attorneys.

MAGAZINE FOR MAGNETIC RECORDING APPARATUS

Filed May 16, 1945 3 Sheets-Sheet 2

Inventor:
Leland B. Greenleaf,
By Dawson, Ooms and Booth,
Attorneys.

Aug. 15, 1950 L. B. GREENLEAF 2,519,312

MAGAZINE FOR MAGNETIC RECORDING APPARATUS

Filed May 16, 1945 3 Sheets-Sheet 3

Inventor:
Leland B. Greenleaf,
By Dawson, Ooms and Booth.
Attorneys.

Patented Aug. 15, 1950 2,519,312

UNITED STATES PATENT OFFICE 2,519,312

MAGAZINE FOR MAGNETIC RECORDING APPARATUS

Leland B. Greenleaf, Elkhart, Ind., assignor, by mesne assignments, to Armour Research Foundation of Illinois Institute of Technology, Chicago, Ill., a corporation of Illinois Application May 16, 1945, Serial No. 594,122

12 Claims. (Cl. 242—138)

This invention relates to magazines for magnetic recording apparatus and particularly to magazines for carrying spools of wire and which are adapted to be detachably mounted on a recording or reproducing apparatus.

One of the objects of the invention is to provide a magazine in which the spool is tightly held when not in use and which is released when placed on the apparatus in operative position.

Another object is to provide a magazine in which the spool is released by attachment of the magazine to a recording or reproducing apparatus.

Still another object is to provide a magazine in which the spool is fully enclosed and tightly held to protect the spool and the wire thereon and to prevent the wire from tangling.

Still another object is to provide a magazine having relatively rotatable parts to open a door or opening through which the wire may pass and at the same time to separate the parts. In one desired arrangement rotation of the entire magazine secures it to the apparatus so that by one turning movement, the magazine is secured in place, is opened for passage of the wire and is separated to free the spool.

A further object is to provide a magazine in which the parts are separated to free the spool by operating means on the apparatus which may be controlled in conjunction with starting and stopping of the apparatus.

The above and other objects and advantages of the invention will be more readily apparent from the following description when read in connection with the accompanying drawing, in which—

Figures 1, 2, 3, 4, 5, 6:
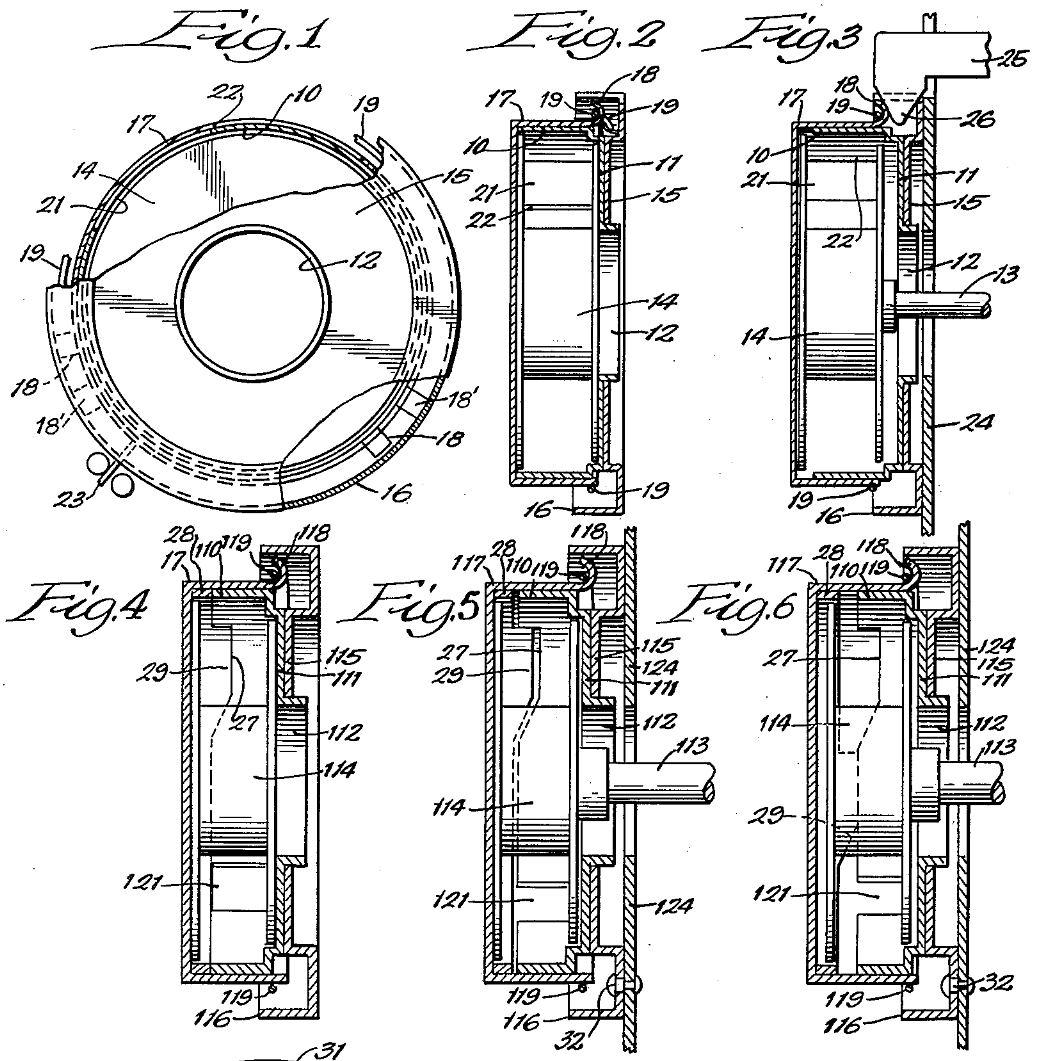
Figure 1 is an elevation with parts in section of a magazine embodying the invention.
Figure 2 is a central axial section.
Figure 3 is a section through the magazine and parts of a recording apparatus, showing the magazine in operative position thereon.
Figures 4, 5 and 6 are axial sectional views of another magazine illustrating the positions of the parts when detached from an apparatus and when positioned thereon.

The several magazines shown in the drawing are all formed of casing having telescopically and rotatably interfitting parts which hold a spool on which wire is carried. The casing parts are formed with openings in their side walls adapted to register in one relative angular position to provide an opening for passage of the wire from the spool. The casing parts are moved together to engage and hold the spool when the magazine is detached from the apparatus and means are provided either on the magazine itself or on the apparatus and magazine by which the casing parts are separated when the magazine is mounted on the apparatus to free the spool.

In the embodiment shown in Figures 1 to 3, the magazine comprises a casing part having a cylindrical side wall 10 and an integral end wall 11 formed with a central flanged opening 12 through which a shaft 13 on the apparatus may pass. The end wall 11 is preferably recessed as shown to receive one of the end flanges on a spool 14 which is adapted to carry a supply of wire. An annular attaching plate 15 is secured to the end wall 11 and projects beyond the periphery thereof where it is formed with an upwardly turned protecting flange 16.

The casing is completed by a second cup shaped casing part 17 slidably and rotatably fitting over the side wall 10. The two parts are held together by providing thereon circumferentially spaced outwardly projecting lugs 18 and 18' over which an annular spring is threaded. The spring 19 may be plain wire spring, as shown, or may be a helical coil spring, as preferred. It will be understood that the spring 19 passes over the lugs 18 which are carried by the casing part 17 and under the lugs 18' which are carried by the other casing part so that the casing parts are urged together. In this position, as shown in Figure 2, the end flanges of the spool 14 are engaged by the casing parts so that the spool is held in the casing against rotation and against accidental displacement therein. At the same time, the spool is closed by the casing parts against springing or other displacement of the wire therefrom so that tangling of the wire is prevented.

To permit passage of wire to and from the spool, the casing parts are formed with openings adapted to register in one relative angular position thereof. As shown, the side wall 10 has an opening 21 therethrough and a similar opening is formed in the casing part 17, the edge of which is seen at 22 in Figures 2 and 3. To bring the openings into register for use of the wire on the spool a finger piece 23 is secured to the outer casing part 17 by which it may be turned on the side wall 10.

The magazine, as shown in Figures 1 to 3, is adapted to be mounted on a recording or reproducing machine having a supporting plate 24 through which a series of clamping fingers 25 project. The fingers 25, preferably three in number, are adapted to be moved radially inward by control apparatus on the machine which may be operated in conjunction with the starting lever or switch which starts the machine. This insures that the machine cannot be started until the magazine is properly fastened thereon. The fingers 25 are formed with pointed nose portions 26 adapted to extend through slots in the flange 16 to engage the fastening plate 15. The parts are so positioned that when the casing part 17 is turned to bring the openings 21 and 22 into register, the lugs 18 thereon will register with the nose portions 26 of the clamping arms. As the arms move into the position shown in Figure 3, they will simultaneously secure the clamping plate 15 to the supporting plate 24 of the recording apparatus and will cam the casing part 17 outwardly away from the spool. At the same time the shaft 13 is preferably moved outward slightly so that it will move the spool away from the end plate 11. In this position, the spool is freely supported within the casing and may be turned by the shaft 13 to unwind wire therefrom and to rewind wire thereon. Upon completion of a recording or reproducing operation, the clamping fingers will be moved away from the magazine permitting the casing parts again to move together into engagement with the spool. Preferably the end of the wire is left projecting through the openings 21 and 22 so that when the casing part 17 is turned to close the opening 21 the wire will be held to facilitate handling during subsequent uses.

The magazine shown in Figures 4 to 7 is constructed similarly to that of Figures 2 and 3 and parts thereof which correspond to like parts in Figures 2 and 3 are indicated by the same reference numerals plus 100. In this construction, the outer edge of the casing wall 110 is formed with a cam notch 27 and a cam ring 28 formed with a projection 29 is mounted in the casing part 117. In this construction, the magazine is adapted to be attached to the apparatus by keyhole slots 31 formed in the fastening plate 115 to receive fastening pins 32 on the supporting plate 124 of the apparatus.

Figure 7:
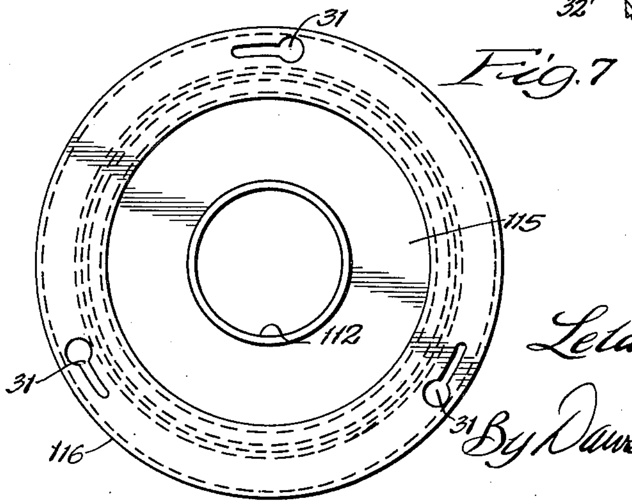
Figure 7 is an end elevation of the magazine of Figures 4, 5 and 6.

When the magazine is detached from the apparatus, the parts will occupy the position shown in Figure 4 in which the casing parts engage and hold the spool. To attach the magazine to the apparatus, the enlarged ends of the slots 31 are passed over the pins 32 and the entire magazine is turned slightly in a clockwise direction, as seen in Figure 7. This moves the pins 32 to the smaller ends of the keyhole openings to secure the fastening plate 115 to the supporting plate 124 of the machine. It will be noted that during this operation, the shaft 113 has pressed the spool slightly away from the end plate 111 and has moved the outer casing part 117 slightly outward. A continuation of the turning on the casing part 117 in the same direction will cause the projection 29 to ride out of the cam notch 27 so that the casing parts will be separated as shown in Figure 6 to free the spool and to bring the openings 121 and 122 into register. The magazine is thus in operative condition on the apparatus with the spool freely supported on the shaft 113 for turning therewith without interference from the casing. To remove the magazine, the operator simply grasps the outer casing part 117 and turns it in the opposite direction to reverse the steps described above. It will be noted that in the casing turning operations described in connection with both embodiments, the lugs 118 will slide over the wire 119 without releasing the spring tension tending to urge the casing parts together and that the spacing of the lugs will determine the maximum permissible turning movement.

Figures 8, 9, 10, 11, 12, 13:
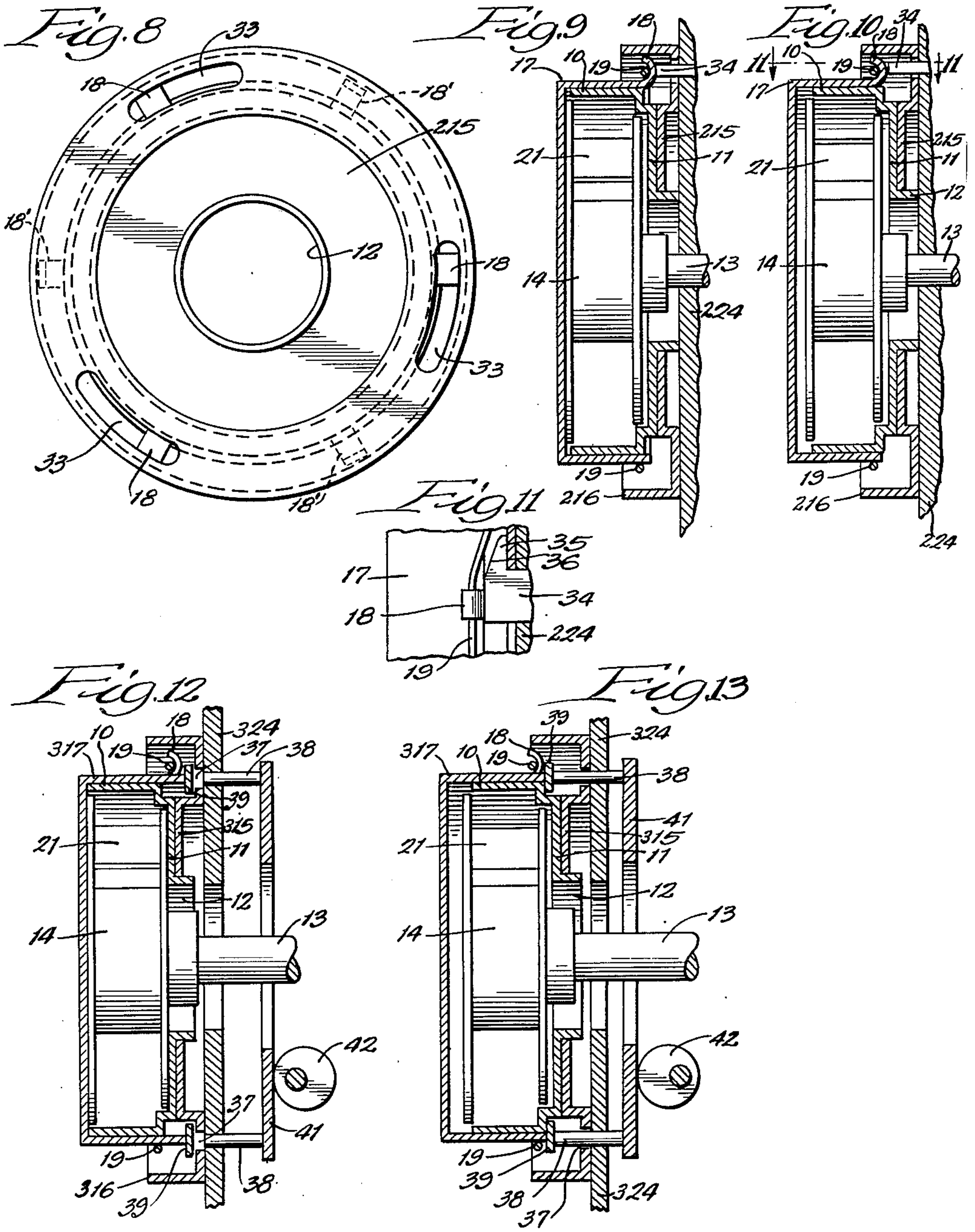
Figure 8 is an end elevation of another magazine embodying the invention.
Figures 9 and 10 are axial sections of the magazine of Figure 8 showing the parts in different positions relative to a recording apparatus.
Figure 11 is a partial section on the line 11—11 of Figure 10.
Figures 12 and 13 are sectional views of still another magazine illustrating different positions thereof in connection with a recording apparatus.

The magazine shown in Figures 8 to 11 is essentially similar to that of Figures 1 to 3 and parts therein identical with like parts in Figures 1 to 3 have been indicated by the same reference numerals while parts modified from corresponding parts in Figures 1 to 3 are indicated by the same reference numerals plus 200. In this construction, the fastening plate 215 is formed in its peripheral portion with a series of elongated slots 33 which are adapted to receive fastening lugs 34 on the supporting plate 224 of the apparatus. The lugs 34, as best seen in Figure 11, are formed with circumferentially extending fastening portions 35 and with sloping outer edge surfaces 36 forming cam surfaces.

In installing this magazine on the apparatus, the openings 33 are placed over the fastening lugs 34 and the entire magazine is turned to move the fastening portions 35 out of register with the openings and over a part of the fastening plate the outer casing part 17 will cause the lugs 18 thereon to ride up over the cam surfaces 36 so that the outer casing part 17 will be cammed away from the spool and the inner casing part, as shown in Figure 10. The same turning movement will bring the openings 21 and 22 into register for passage of the wire. Thus, in this embodiment, as in the embodiment of Figures 4 to 7, a simple turning movement in one direction serves to secure the magazine to the apparatus to open the door or opening through which the wire passes and to disengage the casing parts from the spool to free the spool.

The magazine construction of Figures 12 and 13 is again essentially similar to that of Figures 1 to 3 and parts therein identical with like parts in Figures 1 to 3 have been indicated by the same reference numerals while parts modified slightly from corresponding parts in Figures 1 to 3 are indicated by the same reference numeral plus 300. In this construction, the fastening plate 315 may be secured to the supporting plate 324 of the recording machine in any desired manner as, for example, by clamping fingers such as those shown in Figure 3 or by cooperating fastening parts, as shown in Figures 4 to 7 and Figures 8 to 11. The fastening plate is formed in its peripheral portion with a plurality of openings 37 which register with pins 38 extending through the supporting plate 324 when the magazine is secured to the plate. The pins 38 are adapted to engage a ring 39 carried by or registering with the inner edge of the casing part 317 so that when the pins are moved outwardly to the position of Figure 13, the casing parts will be separated.

The pins are carried by an annular disc 41 which is adapted to be moved outwardly under the control of a cam mechanism or the like operated by the starting lever of the machine. As shown diagrammatically in Figures 12 and 13, a rotatable cam 42 on the apparatus engages the plate 41 to move it. Preferably the shaft 13 is simultaneously moved outward but to a lesser extent and at a slower rate than the disc 41.

In using this magazine, it is first secured to the recording apparatus as indicated in Figure 12. When the starting lever is turned to start the apparatus, the shaft 13 will move outward slightly to move the spool away from the end plate 11. At the same time the cam 42 will be turned to cam the disc 41 and the pins 38 outward to separate the casing part 317 from the spool and the other casing part. When the starting lever is again turned to stop the machine, the shaft will be moved inward and the cam 42 will be returned to the position of Figure 12 to restore the magazine parts to their initial position.

Figure 14:
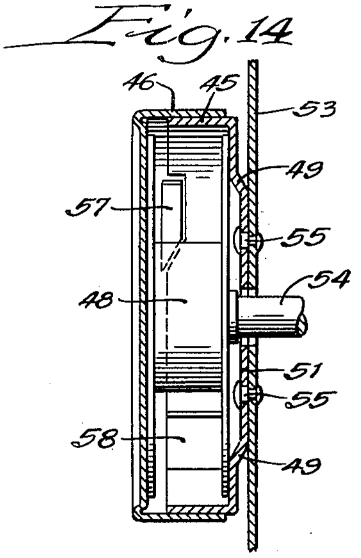
Figure 14 is a sectional view of still another magazine embodying the invention.
Figure 15:
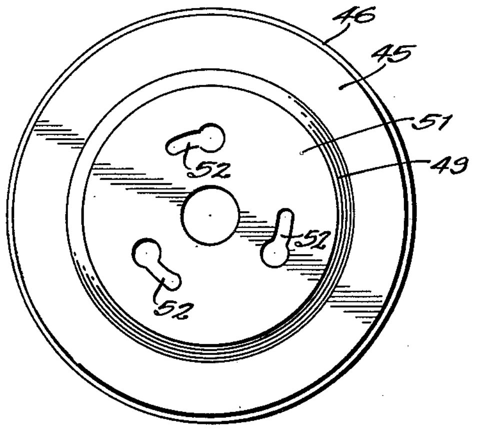
Figure 15 is an end view of the magazine looking from the right in Figure 14.

The magazine shown in Figures 14 and 15 is a somewhat simplified form including two casing parts 45 and 46 telescopically interfitting and of such size as frictionally to engage each other. The casing parts 45 and 46 may be metal stampings, plastic mouldings or the like and are generally cup shaped in form, as shown, to receive a spool 48. The end wall of the casing part 45 is offset, as indicated at 49, to leave a space opposite the spool. The wall portion 51 lying within the offset 49 is formed as best seen in Figure 15 with a plurality of keyhole openings 52 to receive fastenings on the recording or reproducing apparatus.

The apparatus, as illustrated in part in Figure 14, includes a supporting plate 53 through which a shaft 54 projects to extend into a shaft receiving opening in the spool 48. The plate 53 carries a plurality of fastening lugs or rivets 55 which are similar in number and spacing to the openings 52 and have heads to fit within the openings to secure the casing part 45 to the apparatus.

The casing part 46 is formed on its interior with a pressed in cam projection 57 thereon to be received within a notch in the outer edge of the casing part 45. The casing parts are formed with openings as indicated at 58 to register in one position of rotation thereof to provide for passage of wire to and from the spool.

When the magazine of Figure 14 is detached from the apparatus, the casing parts are telescoped together by manual pressure or otherwise to engage the flanges on the spool so that the spool is held securely in the magazine, as in the embodiments described above. To install the magazine on the apparatus, the openings 52 are slipped over the pins 55 and the magazine is turned to move the pins into the small ends of the openings. Continued turning of the outer casing part 46 causes the cam projection 57 to ride out of the cam groove in the casing part 45 to separate the casing parts so that the spool will be freed. This same turning motion will bring the openings 58 in the casing parts into register to provide for passage of the wire.

Figure 16:
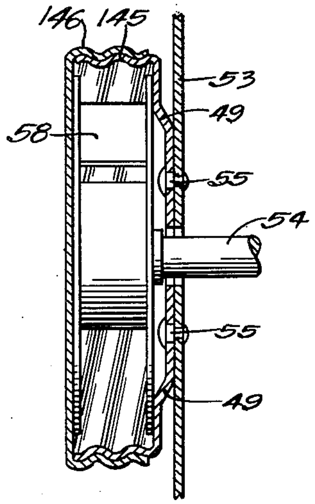
Figure 16 is a sectional view of still another magazine.

The construction shown in Figure 16 is substantially identical with that of Figures 14 and 15 except for the means for separating the casing parts and parts in Figure 16 corresponding to like parts in Figure 14 have been indicated by the same reference numerals. In this construction, the telescoping side walls of the casing parts are formed by rolling, molding or otherwise with interfitting threads which will serve on relative rotation of the casing parts to move them together or apart. The threads are preferably formed with a relatively steep pitch in such a direction that turning of the casing part 146 relative to the casing part 145 in the same direction required to connect the casing part 145 to the fastening pins 55 will separate the casing parts and free the spool 48 and will at the same time bring the openings 58 into register for passage of the wire.

In using this magazine, the casing part 145 is secured to the pins 55 by a turning motion and continued turning of the outer casing part 146 in the same direction will move it away from the casing part 145 due to the action of the threads to free the spool. In removing the magazine, the casing part 146 is grasped and turned in the opposite direction to telescope the casing parts together into engagement with the spool, to close the openings 58 and to detach the magazine from the fastening pins 55.

While several embodiments of the invention have been shown and described in detail, it will be understood that these are illustrative only and are not intended as a definition of the scope of the invention, reference being had for this purpose to the appended claims.

What is claimed is:

1. A magazine for a magnetic recording apparatus comprising telescopically interfitting casing parts, a spool in the casing formed by the parts, and resilient means engaging the parts and urging them axially together into engagement with the ends of the spool to hold the spool tightly within the casing.

2. A magazine for a magnetic recording apparatus comprising telescopically interfitting casing parts, a spool in the casing formed by the parts, circumferentially spaced lugs on the parts, and an annular spring threaded over the lugs to urge the casing parts together.

3. A magazine for a magnetic recording apparatus comprising telescopically interfitting casing parts, a spool in the casing formed by the parts, the casing parts having openings therein which register in one relative angular position thereof and through which wire may pass, circumferentially spaced lugs on the casing parts, and an annular spring threaded over the lugs to urge the casing parts together, the lugs sliding over the spring as the casing parts are rotated to bring the openings into or out of register.

4. A magazine for use with a magnetic recording apparatus having a shaft and magazine holding means comprising telescopically interfitting casing parts, a spool in the casing parts, resilient means engaging the parts urging them together and against the spool, the spool being formed with a shaft receiving opening, and means on each of the casing parts to be engaged by the holding means to separate the casing parts when the magazine is mounted on the apparatus.

5. A magazine for use with a magnetic recording apparatus having a shaft and magazine holding means comprising telescopically interfitting casing parts, a spool in the casing parts, the spool being formed with a central shaft receiving opening, circumferentially spaced lugs on the casing parts, an annular spring threaded over the lugs urging the casing parts together, and a fastening ring on one of the casing parts to be engaged by the holding means to secure the magazine to the apparatus, the lugs on the other of the casing parts being so located as to engage the holding means whereby the holding means separates the casing parts when the magazine is mounted on the apparatus.

6. A magazine for a magnetic recording apparatus comprising telescopically and rotatably interfitting casing parts, a spool in the casing parts, resilient means urging the casing parts together and into engagement with the spool, and cooperating cam portions on the casing parts to separate them upon relative rotation thereof.

7. A magazine for a magnetic recording apparatus comprising telescopically and rotatably interfitting casing parts, a spool in the casing parts, resilient means urging the casing parts together and into engagement with the spool, the casing parts being formed with openings which register in one relative angular position of the parts, and cooperating cam portions on the parts to separate them when they are turned to said one angular position.

8. A magazine for a magnetic recording apparatus comprising telescopically and rotatably interfitting casing parts, a spool in the casing parts, resilient means urging the casing parts together and into engagement with the spool, one of the casing parts being formed with openings to receive fastening projections on a recording apparatus to secure the magazine to the apparatus when it is turned in one direction, and cam means acting on the other casing part when it is turned in said one direction relative to said one of the casing parts to separate the casing parts.

9. A magazine for a magnetic recording apparatus comprising telescopically and rotatably interfitting casing parts, a spool in the casing parts, resilient means urging the casing parts together and into engagement with the spool, one of the casing parts being formed with openings to receive fastening projections on a recording apparatus to secure the magazine to the apparatus when it is turned in one direction, and cam means acting on the other casing part when it is turned in said one direction relative to said one of the casing parts to separate the casing parts, the casing parts being formed with openings in their side walls which are brought into register when the other casing part is turned in said one direction.

10. In a magnetic recording apparatus, in combination, a pair of telescopically interfitting casing parts, a spool in the casing parts, resilient means urging the casing parts together into engagement with the spool, a shaft on the apparatus to engage and support the spool, means on one of the casing parts by which it is secured to the apparatus, and means on the apparatus engageable with the other casing part to move it away from said one casing part against the resilient means.

11. In a magnetic recording apparatus, in combination, a pair of telescopically interfitting casing parts, a spool in the casing parts, resilient means urging the casing parts together into engagement with the spool, a shaft on the apparatus to engage and support the spool, means on one of the casing parts to secure it to the apparatus, and means on the apparatus movable into engagement with the other casing part to move it away from said one of the casing parts.

12. In a magnetic recording apparatus, in combination, a pair of telescopically interfitting casing parts, a spool in the casing parts, resilient means urging the casing parts together into engagement with the spool, a shaft on the apparatus to engage and support the spool, and movable fastening members on the apparatus engageable with the casing parts to secure one of the parts to the apparatus and having cam portions thereon engageable with the other casing part to move the other casing part away from the spool.

LELAND B. GREENLEAF.

REFERENCES CITED

The following references are of record in the file of this patent:

UNITED STATES PATENTS

| Number | Name | Date |
|---|---|---|
| 1,403,522 | Pittman | Jan. 17, 1922 |
| 1,623,486 | Meyering | Apr. 5, 1927 |
| 1,747,931 | Debrie | Feb. 18, 1930 |
| 1,975,782 | Foster | Oct. 9, 1934 |
| 2,401,632 | Greenleaf | June 4, 1946 |
| 2,415,133 | Heineman | Feb. 4, 1947 |